US012297803B2

(12) United States Patent
Magaña et al.

(10) Patent No.: US 12,297,803 B2
(45) Date of Patent: May 13, 2025

(54) SYSTEM FOR HANDLING A WIND TURBINE TOWER SECTION AND CORRESPONDING METHOD

(71) Applicant: Nordex Energy Spain S.A.U., Barásoain (ES)

(72) Inventors: Unai Arraztoa Magaña, Irurita (ES); Rajesh Rajendiran, Chennai (IN); Iñaki Bidegain Ameztoy, Sarriguren (ES); Christopher Naveen Irudayaraj, Chennai (IN); Lokesh Panneerselvam, Chennai (IN)

(73) Assignee: Nordex Energy Spain S.A.U., Barásoain (ES)

( * ) Notice: Subject to any disclaimer, the term of this patent is extended or adjusted under 35 U.S.C. 154(b) by 0 days.

(21) Appl. No.: 18/068,989

(22) Filed: Dec. 20, 2022

(65) Prior Publication Data
US 2023/0193879 A1 Jun. 22, 2023

(30) Foreign Application Priority Data

Dec. 22, 2021 (EP) .................................. 21383190

(51) Int. Cl.
*F03D 13/20* (2016.01)
(52) U.S. Cl.
CPC .......... *F03D 13/22* (2016.05); *F05B 2230/50* (2013.01)
(58) Field of Classification Search
CPC ...................................................... F03D 13/22
See application file for complete search history.

(56) References Cited

U.S. PATENT DOCUMENTS

| 2011/0194896 A1* | 8/2011 | Fenger .................... F03D 13/40 403/373 |
| 2013/0104376 A1* | 5/2013 | Pedersen ................. F03D 80/00 29/525.02 |
| 2015/0003954 A1 | 1/2015 | Koerner et al. |
| 2015/0308134 A1 | 10/2015 | Bjoernskov et al. |
| 2018/0111750 A1* | 4/2018 | Klein ...................... F03D 13/40 |

FOREIGN PATENT DOCUMENTS

| DE | 10 2012 002 755 A1 | 8/2013 |
| WO | 2010/012280 A1 | 2/2010 |

OTHER PUBLICATIONS

Extended Search Report of the European Patent Office dated Jun. 15, 2022 for European application 21383190.2 on which this application is based.

* cited by examiner

*Primary Examiner* — Sean Gugger
(74) *Attorney, Agent, or Firm* — Walter Ottesen, P.A.

(57) ABSTRACT

A system for handling a wind turbine tower section and corresponding method for operating are provided. The system includes a frame configured to support an end of the tower section, the frame having a support base and a connecting plate provided thereon that includes a base portion configured to be attached to the support base, and an abutment portion extending transversally from the base portion and configured to be attached to a flange at the tower section end.

21 Claims, 13 Drawing Sheets

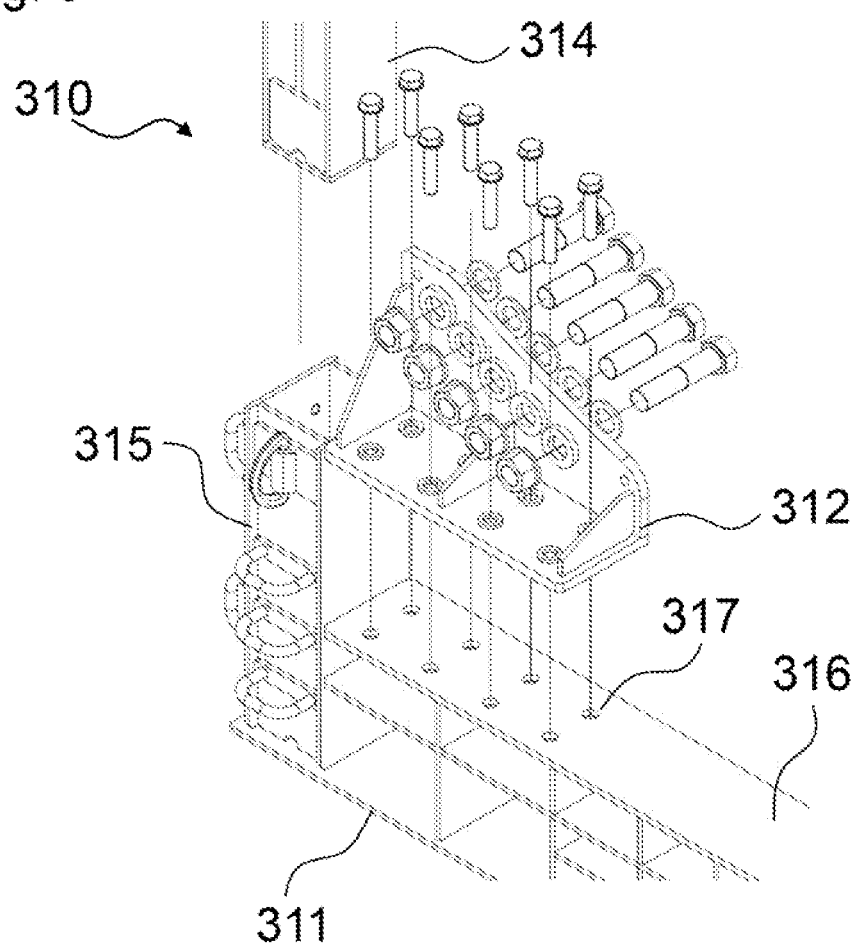

314

314

314

314

SYSTEM FOR HANDLING A WIND TURBINE TOWER SECTION AND CORRESPONDING METHOD

CROSS-REFERENCE TO RELATED APPLICATIONS

This application claims priority of European patent application no. 21383190.2, filed Dec. 22, 2021, the entire content of which is incorporated herein by reference.

BACKGROUND

Wind turbines with wind turbine rotor blades mounted at the uppermost part of a tower are widely known from the state of the art and are used to convert wind energy into electrical energy. Their development has led to ever larger wind turbine proportions, with the turbine's power generation capacity being directly related to the length of the turbine blades and in turn being determinative of the tower height. Transportation and manufacturing constraints often dictate that tall towers be separated into plural tower sections, which are finally assembled at the generation site. Commonly, towers and tower sections taper from base to top so as to provide requisite strength.

Handling of towers and tower sections presents a challenge given the various modes of transportation to a generation site possibly required, including ships, barges, trains and trucks, particularly in view of the tapered profiles.

SUMMARY

Embodiments of the present disclosure provide a system for cost-efficiently and safely handling a wind turbine tower section. Further embodiments of the present disclosure provide a corresponding method for operating the system.

According to a first aspect, a system for handling a wind turbine tower section is specified.

A wind turbine tower generally extends along a main extension direction and has a contour in cross-section that is, for example, round or oval. A longitudinal axis of the tower runs centered parallel to the main extension direction. Here and in the following, a wind turbine tower section denotes a section of the wind turbine tower along the main extension direction.

The tower section extends along the longitudinal axis from a first end of the tower section to an opposing second end of the tower section. On its first end, the tower section includes a flange. The flange may be configured to attach the tower section to a flange of another tower section of the same tower or to attach the tower section to a foundation of the tower. The flange may include suitable connecting means for the attachment such as bolts or bolt holes.

In an embodiment according to the first aspect, the system includes a first frame configured to support the first end of the tower section. The first frame is particularly configured to bear acceleration loads acting at the first end of the tower section.

The first frame includes a first support base and a first connecting plate. The first connecting plate is provided on the first support base. Here and in the following, a support base shall denote a mobile fixture having a mounting area on which the connecting plate can be provided. Such a mobile fixture is particularly configured to carry the respective end tower section via the first connecting plate.

The first connecting plate includes a base portion and an abutment portion. The base portion of the first connecting plate is configured to be attached to the first support base. The base portion is particularly in direct contact with the first support base. The base portion is particularly reversibly attachable to the first support base.

The abutment portion of the first connecting plate extends transversally from the base portion of the first connecting plate and is configured to be attached to the flange at the first end of the tower section.

The abutment portion can, for example, be perpendicular to the base portion. For example, the two portions are welded together. Alternatively, for example, the two portions of the connecting plate may be cast in one piece.

The abutment portion is particularly in direct contact with the flange. The abutment portion is particularly reversibly attachable to the flange.

In an embodiment according to the first aspect, the first connecting plate is provided at a central position of the first support base, for example, centered with respect to the longitudinal axis of the tower section.

In an embodiment according to the first aspect a pair of first connecting plates is provided. The two first connecting plates are configured to be arranged on the first support base such that the first end of the tower section is fixedly connected to the first support base by each of the first connecting plates at substantially the same distance from the longitudinal axis of the tower section.

This means that acceleration loads acting at the first end of the tower section are in general evenly distributed amongst the first connecting plates. When attached to the flange of a tower section in horizontal orientation, the base portions of the first connecting plates as well as the first support base particularly extend in the horizontal orientation, and mainly extend in particular in the direction of a component of the horizontal orientation perpendicular to the longitudinal axis of the tower section.

Here and in the following, a "vertical orientation" refers to the direction in which a tower section's longitudinal axis points when assembled at the generation site. Perpendicular to the "vertical orientation" lies a plane that is denoted as the "horizontal orientation" of the tower section, in which the longitudinal axis lies, for example, during transportation of the tower section. The plane is spanned by the longitudinal axis and above mentioned perpendicular component in which the first support base mainly extends.

Preferably, the first connecting plates are distanced from each other by at least R/4, R denoting the radius of the tower section at the first end. Advantageously, stress concentration in the middle can thus be avoided.

The first connecting plates are particularly arranged in a lower part of the tower section's circumference at the respective end to be supported. "Lower part" in this respect means, for example, the lower half of the tower section in horizontal orientation closer to the ground.

The first frame can be used for handling a specific tower section or end of a tower section, and reused for others afterwards. Specifically, while a same support base may be used for different tower sections irrespective of the tower section's dimensions (or at least within a reasonable range of expectation), a (pair of) different connecting plate(s) may be selected depending, for example, on the tower section's circumference at the respective end to be supported, that is, at the tower's contour of the respective cross-section. Such modularity may particularly be beneficial for towers with tapered profile, that is, when individual tower sections have different circumferences at their opposed ends.

In an embodiment, according to the first aspect, the bolt holes at the abutment portions of the first connecting plate(s) have a diameter and curvature corresponding to the respective diameter and curvature of the bolt holes at the respective flange. In other words, the bolt holes in the connecting plates each match in size and position the bolt holes at the flange. This could, for example, be particularly useful to easily select or verify the selection of connecting plates for a specific tower section end in case of tower sections with tapered profile, when the flanges have differing circumferences.

In an embodiment according to the first aspect, the tower section includes a flange on its second end. The flange at the second end may be configured to attach the tower section to a flange of another tower section of the same tower, and may include suitable connecting means for the attachment similar to the flange at the first end.

In an embodiment according to the first aspect, the system further includes a second frame configured to support the second end of the tower section. The second frame may be configured similar to the first frame; the explanations and advantages given above thus may apply accordingly.

In an embodiment according to the first aspect, the second frame includes a second support base and a second connecting plate. The second connecting plate is provided on the second support base. The second connecting plate includes a base portion and an abutment portion. The base portion of the second connecting plate is configured to be attached to the second support base. The abutment portion of the second connecting plate extends transversally from the base portion of the second connecting plate and is configured to be attached to the flange at the second end of the tower section.

In an embodiment according to the first aspect, the second connecting plate is provided at a central position of the second support base, for example, centered with respect to the longitudinal axis of the tower section.

In an embodiment according to the first aspect, a pair of second connecting plates is provided. The second connecting plates are configured to be arranged on the second support base such that the second end of the tower section is fixedly connected to the second support base by each of the second connecting plates at substantially the same distance from the longitudinal axis of the tower section.

The second frame may differ from the first frame, for example, in that the connecting plates are configured for a different tower section's circumference, while including an identical support base, thus allowing for cost-efficient handling of tower sections with tapered profile.

For example, in an embodiment according to the first aspect, the system includes a first frame and a (pair of) first connecting plate(s), wherein the first connecting plates include an abutment portion and a base portion and wherein the bolt holes at the abutment portions of the first connecting plate(s) have a diameter and position corresponding to the respective diameter and curvature of the bolt holes at the flange of the first end of a first tower section. The system also includes a second frame and a (pair of) second connecting plate(s), wherein the second connecting plates include an abutment portion and a base portion and wherein the bolt holes at the abutment portions of the second connecting plate(s) have a diameter and position corresponding to the respective diameter and curvature of the bolt holes at the flange of the second end of a first tower section. The base portions of both first and second connecting plates are interchangeably coupled to the first and second frames. In other words, the bolt holes in the abutment portion of the connecting plates each match in size and position the bolt holes at the corresponding flange, and the bolt holes in the base portions of both the first and second connecting plates match in size and position the bolt holes at the support base of the first and second frames. Therefore, a modular system is achieved, where only connecting plates with different bolt holes number and/or diameter and/or position may be configured to be attached to a specific tower section end.

In particular, in an embodiment according to the first aspect, the system includes a plurality of first connecting plates and a plurality of second connecting plates. Each (pair) of the plurality of first connecting plates is configured to be coupled to the flanges of the first end of each section of a particular tower. Specifically, the bolt holes at the abutment portions of the plurality of the first connecting plates have diameters and positions corresponding to the respective diameters and curvatures of the bolt holes at the flanges of the first ends of each tower section of a particular tower. In the same way, each (pair) of the plurality of second connecting plates is configured to be coupled to the flanges of the second end of each tower section of a particular tower. Specifically, the bolt holes at the abutment portions of the plurality of second connecting plates have diameters and positions corresponding to the respective diameters and curvatures of the bolt holes at the flanges of the second ends of each tower section of a particular tower.

For example, according to the previous embodiment applied to a conical tower including five different tower sections, the system includes five different (pairs of) first connecting plates and five different (pairs of) second connecting plates. Specifically, the bolt holes at the abutment portions of each of the five (pairs of) first connecting plate(s) have diameters and positions corresponding to the respective diameters and curvatures of the bolt holes at the flanges of the first ends of each of the five tower sections of the tower. In the same way, each (pair) of the plurality of the second connecting plates are configured to be coupled to the flanges of the second end of each tower section of a particular tower. Specifically, the bolt holes at the abutment portions of each of the five (pairs of) second connecting plates have diameters and positions corresponding to the respective diameters and curvatures of the bolt holes at the flanges of the second ends of each of the five tower sections of the tower.

In an embodiment according to the first aspect, the system further includes an upper connecting plate. The upper connecting plate includes a base portion and an abutment portion. The upper connecting plate may be configured similar to the first or second connecting plates; the explanations and advantages given above thus may apply accordingly.

In an embodiment according to the first aspect, in a first implementation manner, the base portion of the upper connecting plate is configured to be attached to the first support base. The abutment portion of the upper connecting plate extends transversally from the base portion of the upper connecting plate and is configured to be attached to the flange at the first end of the tower section. The upper connecting plate is configured to be arranged at an upper side of the first end of the tower section opposite to the (pair of) first connecting plate(s) with respect to the longitudinal axis of the tower section.

In an embodiment according to the first aspect, in a second implementation manner, the base portion of the upper connecting plate is configured to be attached to the second support base. The abutment portion of the upper connecting plate extends transversally from the base portion of the upper connecting plate and is configured to be attached to the flange at the second end of the tower section.

The upper connecting plate is configured to be arranged at an upper side of the second end of the tower section opposite to the (pair of) second connecting plate(s) with respect to the longitudinal axis of the tower section.

The base portion of the upper connecting plate is particularly indirectly coupled to the first support base, for example, via an intermediate base and/or distanced via columns as will be discussed further below. While the first connecting plates are particularly arranged in a lower part of the tower section's circumference at the respective end to be supported, the upper connecting plate is arranged in an opposed upper part, particularly centered at the top. "Upper part" in this respect means, for example, the upper half of the tower section in horizontal orientation facing away from the ground. The base portion of the upper connecting plate is particularly reversibly attachable to the first support base. Similar definitions and effects hold true for an upper connecting plate attached to the second support base, accordingly.

For example, in an embodiment according to the first aspect, the system includes a first frame and a (pair of) first connecting plate(s), wherein the first connecting plates include an abutment portion and a base portion and wherein the bolt holes at the abutment portions of the first connecting plate(s) have a diameter and a position corresponding to the respective diameter and curvature of the bolt holes at the flange of the first end of a first tower section. The system also includes a second frame and a (pair of) second connecting plate(s), wherein the second connecting plates include an abutment portion and a base portion and wherein the bolt holes at the abutment portions of the second connecting plate(s) have a diameter and position corresponding to the respective diameter and curvature of the bolt holes at the flange of the second end of a first tower section. The system also includes four columns and two upper connecting plates, wherein the upper connecting plates include an abutment portion and a base portion and wherein the bolt holes at the abutment portions of the first and second upper connecting plates have a diameter and a position corresponding to the respective diameter and curvature of the bolt holes at the flange of the first end and second end of a first tower section, respectively. The base portions of all connecting plates are interchangeably coupled to any of the frames. In other words, the bolt holes in the abutment portion of the connecting plates of the system each match in size and position the bolt holes at the corresponding flange, and the bolt holes in the base portions of the connecting plates match in size and position the bolt holes at the support base of any of the frames. The base portions of the connecting plates are interchangeably coupled to the frames. In other words, the bolt holes in the abutment portion of the connecting plates each match in size and position the bolt holes at the corresponding flange, and the bolt holes in the base portions of the connecting plates match in size and position the bolt holes at the support base of the frames. Also, the height of the columns is adapted in size to the diameter of the tower flange.

Therefore, a modular system is achieved, where only connecting plates with different bolt holes number and/or diameter and/or position and columns with different height need to be configured to be adapted to the specific tower section end to be attached to the system.

In an embodiment according to the first aspect, the connecting plates are L-shaped. In other words, the respective abutment portions are substantially perpendicular or perpendicular to the respective base portions.

Such L-shaped connecting plates particularly allow to put some rigidizers or ribs for stability.

In an embodiment according to the first aspect, the connecting plates each include two, three or more reinforcement elements. Each of the reinforcement elements extends from the base portion of the respective connecting plate towards the abutment portion of the respective connecting plate. Each of the reinforcement elements connects the base portion of the respective connecting plate to the abutment portion of the respective connecting plate.

Reinforcement elements configured as such advantageously act as rigidizers or ribs giving great stability to the structure of the connecting plates. The reinforcement elements especially act against acceleration loads in direction of the longitudinal axis and/or against lateral loads trying to rotate the tower as the reinforcement elements distribute at least some of the lateral load to the horizontally arranged base portion of the connecting plate.

Particularly in combination with L-shaped connecting plates, the reinforcement elements provide a better load transfer. Alternatively, the reinforcement elements could be dispensed and a thickness of the connecting plates increased.

In an embodiment according to the first aspect, the flange of the first end of the tower section includes a plurality of bolt holes along a first curvature. The flange of the second end of the tower section includes a plurality of bolt holes along a second curvature different from the first curvature. This could, for example, be the case for tower sections with tapered profile, when the flanges have differing circumferences.

The abutment portion of the first connecting plates includes bolt holes corresponding to a respective portion of the bolt holes of the flange of the first end of the tower section along the first curvature. The abutment portion of the second connecting plates includes bolt holes corresponding to a respective portion of the bolt holes of the flange of the second end of the tower section along the second curvature. In other words, the bolt holes in the connecting plates each match the arrangement of bolt holes at the flanges. This could, for example, be particularly useful to easily select or verify the selection of connecting plates for a specific tower section end.

In an embodiment according to the first aspect, the bolt holes at the flange of the first end of the tower section have a first diameter. The bolt holes at the flange of the second end of the tower section have a second diameter different from the first diameter.

The bolt holes at the abutment portions of the first and second connecting plates have a diameter corresponding to the respective diameter of the bolt holes at the respective flange. In other words, the bolt holes in the connecting plates each match in size the bolt holes at the flanges. This could, for example, be particularly useful to easily select or verify the selection of connecting plates for a specific tower section end in case of tower sections with tapered profile, when the flanges have differing circumferences.

In an embodiment according to the first aspect, the support bases each include a pair of hole patterns. Each hole pattern includes a plurality of bolt holes. The base portion of the first and second connecting plates includes bolt holes each corresponding to at least a portion of the plurality of bolt holes of one of the hole patterns of the respective support base. This could, for example, be particularly useful to allow mounting of connecting plates of different size depending on the size of the to-be-handled tower section on identical support bases.

In an embodiment according to the first aspect, the frames include a receiver or means to receive a pair of columns on the respective support base. The columns are configured to support a further frame to be stacked above the respective support base. The columns are adapted in height corresponding to the respective circumference of the tower section at the respective end of the tower section supported by the respective frame.

The respective receiver or respective means to receive one of the columns may be configured as a sheath in which the respective column can be slid into. The means are preferably arranged at opposite sides of the respective support base, allowing to arrange the respective connecting plates as distanced from each other as possible.

The columns are particularly reversibly attachable to the respective support base. The columns extend, in particular, perpendicular to the respective main extension direction of the support base and the longitudinal axis of the tower section.

As noted before, a frame can be used for handling a specific tower section or end of a tower section, and reused for others afterwards. And while a same support base may be used for different tower sections irrespective of the tower section's dimensions (or at least within a reasonable range of expectation), different columns may be selected depending, for example, on the tower section's circumference at the respective end to be supported, that is, at the tower's contour of the respective cross-section. Such modularity may particularly be beneficial for towers with tapered profile, that is, when individual tower sections have different circumferences at their opposed ends. Accordingly, via interchangeable columns of different height, the frame may be used to handle tower sections of various circumferences while at the same time, allow to stack further frame(s) and tower section (s) on top. This is, for example, particularly useful for transportation modes without height constraints, such as ships.

In an embodiment according to the first aspect, the frames further include a receiver or means to receive a pair of columns underneath the respective support base. The columns are configured to support the respective frame. The columns are adapted in height corresponding to a respective circumference of a further wind turbine tower section to be arranged underneath the respective frame at a respective end of the further tower section. The columns and means may be configured similar to the aforementioned columns and means; the explanations and advantages given above thus may apply accordingly.

In an embodiment according to the first aspect, the system may include an intermediate base with the receiver or means to receive the columns from underneath, the intermediate base being configured to be arranged underneath a support base of the further frame and configured to receive and/or attach to the support base of the further frame.

In an embodiment according to the first aspect, the first end of the tower section has a first circumference. The second end of the tower section has a second circumference. The first circumference is greater than the second circumference. The system is configured to support above or below the tower section a further wind turbine tower section. The further tower section has a first end of greater circumference than at an opposing second end, and is arranged such that the second end of the further tower section is supported by the further frame stacked above or below the first frame. In other words, the system, and particularly the respective columns, are configured such that an alternating tower section arrangement with respect to their tapered profile is enabled. This greatly contributes to a load distribution between the lower first and second frames while at the same time helps to reduce the total height of the system with the to-be-handled tower sections.

In an embodiment according to the first aspect, the abutment portion of the first and/or of the second and/or of any further connecting plate(s) includes a shear shim plate configured for supporting the flange of the first or second tower section. The shear shim plate is particularly arranged on a side of the abutment portion facing the flange and underneath the bolt holes for connecting with the flange, that is, closer to the ground during transportation of a tower section. Optionally, the shear shim plate is welded to the abutment portion of the respective connecting plate. Preferably, the shear shim plate has the same curvature as the flange to be supported. Advantageously, the shear shim plate may take forces of the bolts for connecting with the flange of the respective tower section during transportation, and may particularly contribute to lower shear forces on these bolts.

According to a second aspect, a method of operating the system according to the first aspect is specified. All definitions, features and effects described along the first aspect shall apply to the second aspect and vice versa, unless specified otherwise.

In an embodiment according to the second aspect, a first wind turbine tower section is provided in a horizontal orientation. The first tower section has a longitudinal axis and extends along the longitudinal axis from a first end to an opposing second end. At the first end, the first tower section has a flange.

A connecting plate is selected. For example, a pair of connecting plates is selected. The (two) connecting plate(s) is/are arranged such that its/their abutment portion(s) face(s) the flange. Herein, optionally, the flange rests on a (respective) shear shim plate of the abutment portion(s). The abutment portion(s) of the (two) connecting plate(s) is/are fixedly connected to the flange.

A support base is provided. The (two) connecting plate(s) is/are arranged such that its/their base portion(s) face(s) the support base. The base portion(s) of the (two) connecting plate(s) is/are fixedly connected to the support base, thereby forming a first frame of the system supporting the first end of the tower section.

In an embodiment according to the second aspect, a second frame of the system supporting the second end of the tower section may be formed accordingly.

In an embodiment according to the second aspect, selecting the (pair of) connecting plate(s) specifically includes: providing two (pairs of) connecting plates, the two (pairs) differing in size and/or the number of bolt holes in their base portions and/or the number of bolt holes in their abutment portions and/or the curvature of bolt holes in their abutment portions and/or the diameter of the bolt holes in their abutment portions, and/or a curvature of the shear shim plate at their abutment portions; and selecting one of the (pairs of) connecting plates to be attached to the flange.

In an embodiment according to the second aspect, a further (for example, second) wind turbine tower section is provided in a horizontal orientation. The second tower section has a longitudinal axis and extends along the longitudinal axis from a first end to an opposing second end. On its second end, the second tower section includes a flange.

A further connecting plate is selected. For example, a pair of further connecting plates is selected. The (two) further connecting plate(s) is/are arranged such that its/their abutment portion(s) faces the flange of the second tower section.

Herein, optionally, the flange rests on a (respective) shear shim plate of the abutment portion(s). The abutment portion(s) of the (two) further connecting plate(s) is/are fixedly connected to the flange of the second tower section.

A pair of columns is selected. The two columns are arranged in a vertical orientation on the support base. The two columns may be attached to the support base.

A further support base is provided. The further support base is arranged on the two columns. For example, the further support base may be attached on the two columns.

The (two) further connecting plate(s) are arranged such that its/their base portion(s) face(s) the further support base. The base portion(s) of the (two) further connecting plate(s) is/are fixedly connected to the further support base, thereby forming a further (for example, third) frame of the system supporting the first end of the second tower section.

In an embodiment according to the second aspect, another (for example, fourth) frame of the system supporting the second end of the second tower section may be formed accordingly.

The base portion(s) of the (two) further connecting plate(s) is/are fixedly connected to the further support base such that the second tower section is arranged parallel to the first tower section and in immediate vicinity of the first tower section.

In an embodiment according to the second aspect, the arrangement is specifically such that the first end of the second tower section is directly above the second end of the first tower section, and the second end of the second tower section is directly above the first end of the first tower section. Herein, in a first implementation manner, a circumference of the first tower section at the first end of the first tower section is greater than a circumference of the first tower section at the second end of the first tower section. Furthermore, a circumference of the second tower section at the first end of the second tower section is greater than a circumference of the second tower section at the second end of the second tower section. In a second implementation manner, the circumference of the first tower section at the first end of the first tower section is greater than the circumference of the first tower section at the second end of the first tower section, while the circumference of the second tower section at the first end of the second tower section is smaller than the circumference of the second tower section at the second end of the second tower section. In a third implementation manner, the circumference of the first and/or second tower section at their respective first end may be equal to the circumference at their second end.

In an embodiment according to the second aspect, selecting the pair of columns specifically includes: providing two pairs of columns, the two pairs differing in height; and selecting one of the pairs to be coupled to the support base.

In an embodiment according to the second aspect, selecting the (pair of) respective connecting plate(s) is based on a circumference of the respective flange. Alternatively or additionally, the selecting is based on a curvature of bolt holes of the respective flange. Alternatively or additionally, the selecting is based on a diameter of the bolt holes of the respective flange.

In an embodiment according to the second aspect, selecting the pair of columns is based on a circumference of the first tower section at the first end. Likewise, the selection of the pair of columns to be arranged at the second end of the first tower section may be based on the circumference of the first tower at the second end.

BRIEF DESCRIPTION OF DRAWINGS

The invention will now be described with reference to the drawings wherein:

FIG. 5 shows the details as shown in FIG. 3 in exploded view;

DETAILED DESCRIPTION

Elements of the same construction or function are marked with the same reference signs across the figures.

Figure 1:
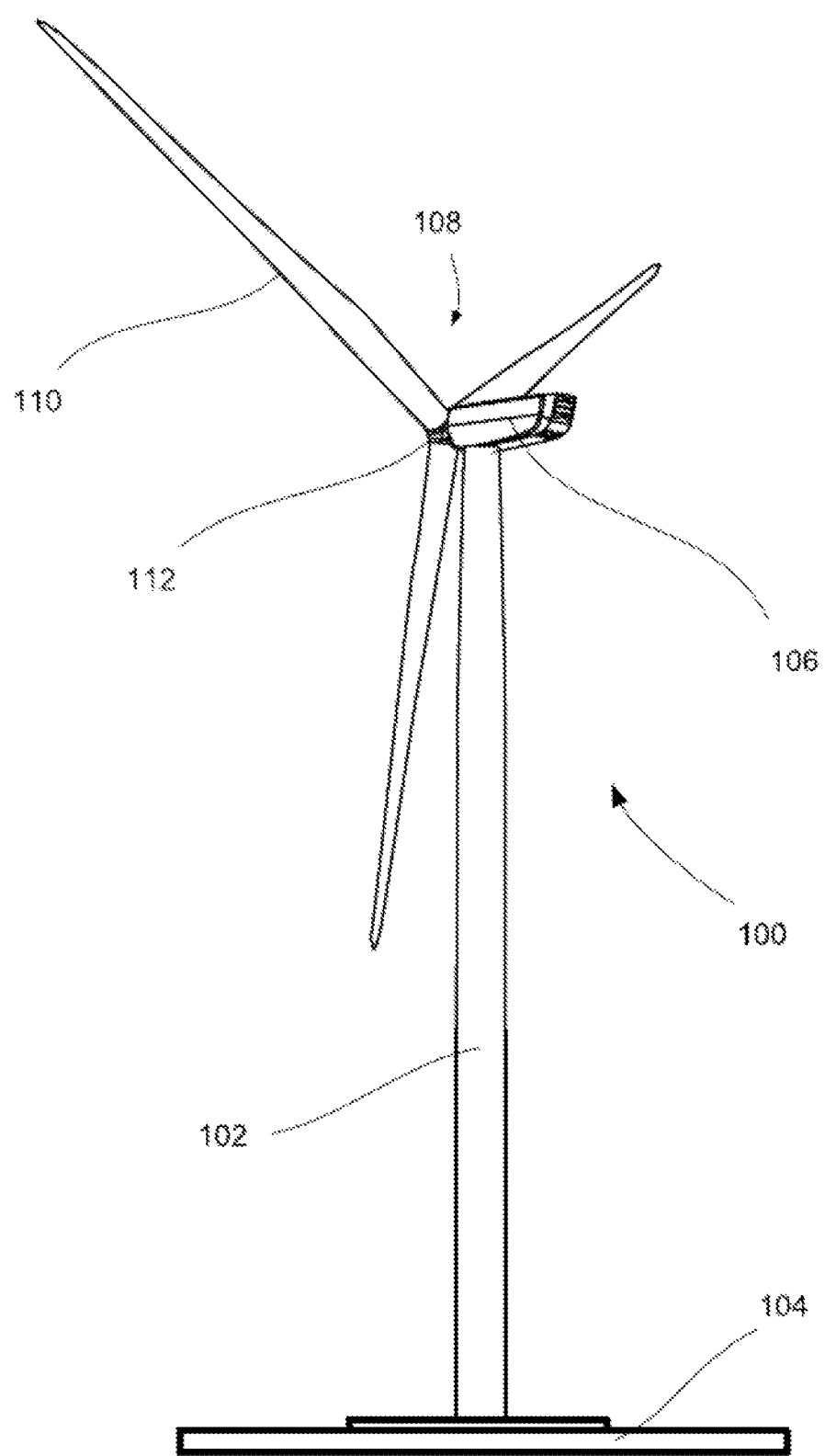
FIG. 1 shows a schematic view of a wind turbine.

FIG. 1 shows a schematic view of a wind turbine 100, which includes a tower 102. The tower 102 is fixed to the ground via a foundation 104. At one end of the tower 102 opposite to the ground a nacelle 106 is rotatably mounted. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the mechanical energy of the rotor 108 into electrical energy.

The tower 102 may be fabricated in one piece, extending along its longitudinal axis from one end forming the bottom of the tower 102 to another end forming the top of the tower 102.

Due to transportation and/or manufacturing constraints, the tower 102 may be fabricated as two or more separate sections 1, 2 (see FIG. 2) to be assembled at the generation site to form the tower 102. Each tower section 1, 2 has a longitudinal axis L along which it extends from a first end 11, 21 to an opposed second end 12, 22. Each tower section 1, 2 has a flange 13, 23 formed at its first and/or second end 11, 12, 21, 22. The flanges 13, 23 may allow two tower sections 1, 2 of the tower 102 to be joined together at the generation site, for example, by bolting. In this respect, the flanges 13, 23 may be provided with a plurality of bolt holes 14, 24 arranged along the flange 13, 23 facing in a direction parallel to [[of]] longitudinal axis L of the tower section 1, 2.

For proper handling of the tower sections 1, 2 a system 300 is provided including a first frame 310 and a second frame 320 for supporting a respective end 11, 21, 12 and 22 of the tower sections 1, 2. As can be further seen from FIG. 2, a third frame 330 and a fourth frame 340 supporting the respective ends 21, 22 of the upper tower section 2 are stacked upon the first and second frames 310, 320 respectively. The frames 310, 320, 330, 340 will be detailed in the following along with the first frame 310 as shown in FIGS. 3 to 23.

Figure 3:
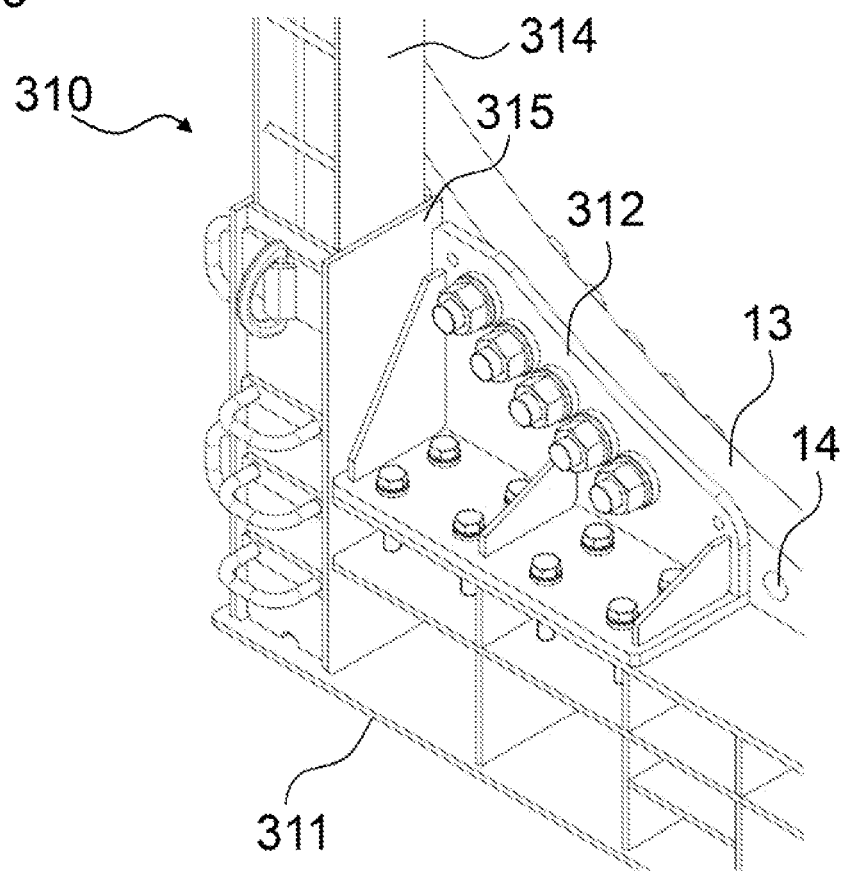
FIG. 3 shows a detail view of the system of FIG. 2.

FIG. 3 depicts a detail view of the first frame 310. The first frame 310 includes a support base 311, a pair of connecting plates 312 (only one shown in the detailed view of FIG. 3) and a pair of columns 314 (again only one shown in the detailed view of FIG. 3).

The support base 311 has a preset width W (see FIG. 9) greater than its height H and/or depth D by at least a factor of 2. The width W is preferably selected such that it is approximately in the order of magnitude of a diameter of to-be-handled tower sections.

The two columns 314 are arranged at the outer sides of the support base 311 and are thus distanced in the order of magnitude of the diameter of to-be-handled tower sections. For example, the columns 314 may be received in a respective sheath 315 formed at the edges of the support base 311. The columns 314 may for example be fixedly coupled to the support base 311 by interlocking elements engaging with the sheath 315.

Figure 4:
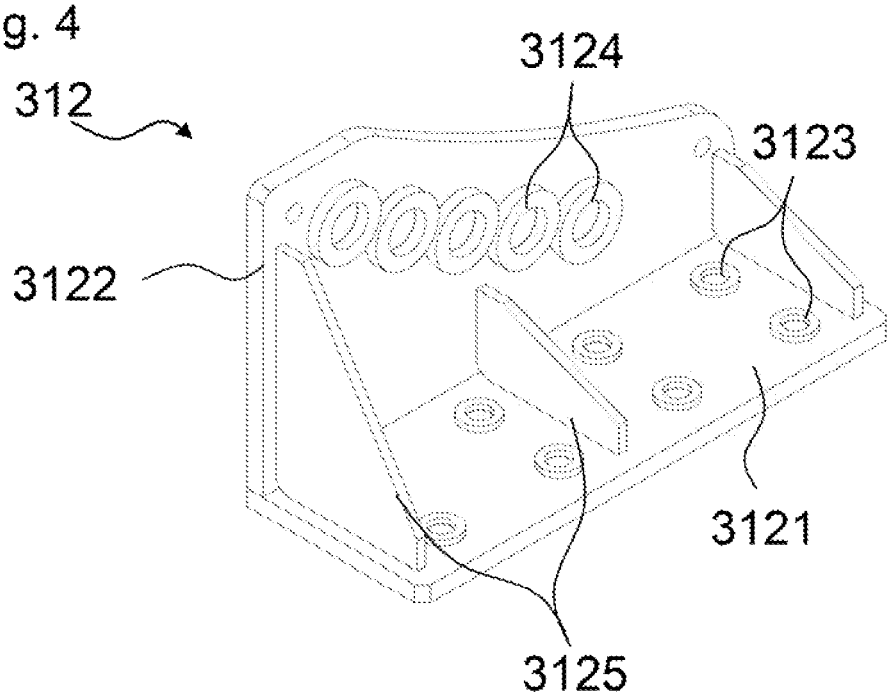
FIG. 4 shows a connecting plate in perspective view.

The connecting plates 312 may be configured to reversibly join together the support base 311 and the flange 13. The two connecting plates 312 are arranged on top of the support base 311, preferably at the outer sides in direct vicinity to the respective sheath 315. As seen in FIG. 4, the connecting plates 312 each include a base portion 3121 and an abutment portion 3122 that extends transversally from the base portion 3121, the two portions 3121, 3122 forming an angle of 90° ("L-shape"), for example.

The base portion 3121 is configured to be attached to an upper surface 316 (see FIGS. 5 to 9) of the support base 311 on which the connecting plate 312 is to be arranged. In this respect, the base portion 3121 may include a plurality of bolt holes 3123, in the example shown eight bolt holes. Likewise, the support base 311 may include a plurality of bolt holes 317 (see FIGS. 5, 7, 9) at matching positions at the upper surface 316, in the example shown also eight bolt holes per connecting plate 312. In other examples, the support base 311 may for example include additional bolt holes, for example, ten bolt holes in total per connecting plate, to attach larger sized base portions 3121 or arrange the base portions 3121 at various preset positions. This may be particularly advantageous to maintain the modular system as flexible as possible so as to allow for handling of tower sections with, for example, flanges of different circumference or curvature.

The abutment portion 3122 is configured to be attached to the flange 313. In this respect, the abutment portion 3122 may include a plurality of bolt holes 3124, in the example shown five bolt holes. The bolt holes 3124 are particularly arranged on the abutment portion 3122 so as to match a position of corresponding bolt holes 14 in the flange 13. In this respect, the bolt holes 3124 may describe a curvature in accordance with the circumference of the flange 13, for example. Furthermore, an upper edge of the abutment portion 3122 facing away from the base portion 3121 may be shaped substantially correspondingly, that is, at least partially describe a curvature in accordance with the circumference of the flange 13.

Figure 4A:
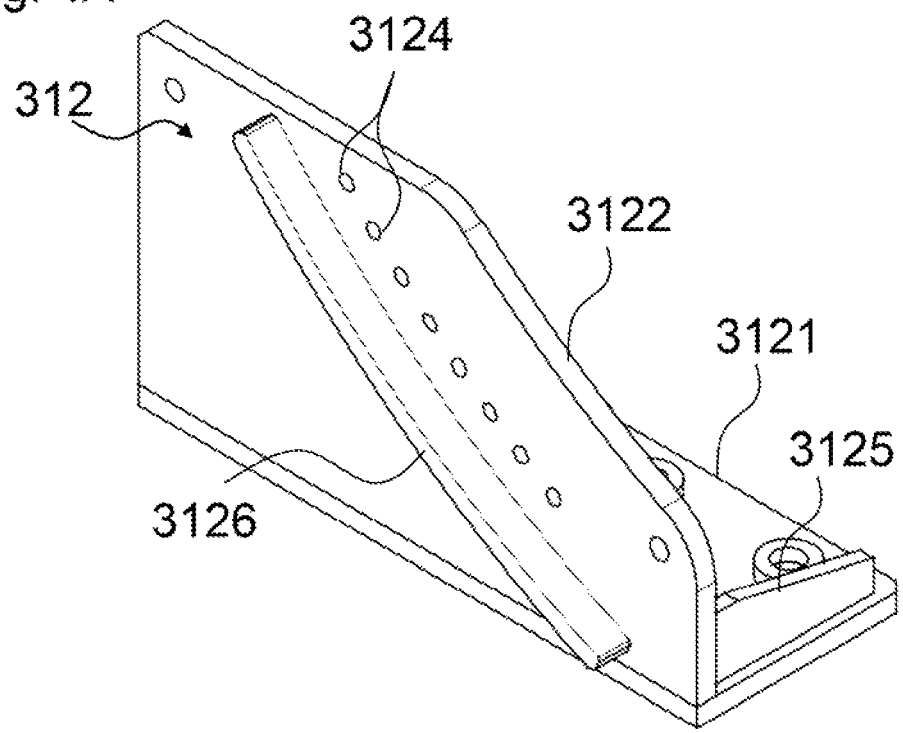
FIG. 4A shows another connecting plate in perspective view, the connecting plate including a shear shim plate.
Figure 4B:
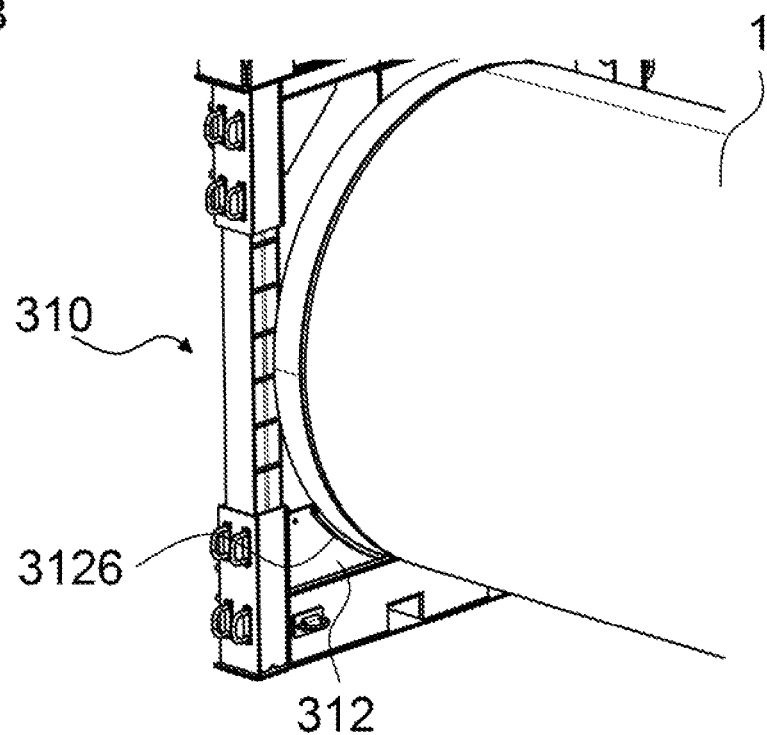
FIG. 4B shows another detail view of the system of FIG. 2 with the connecting plate of FIG. 4A.
Figure 6:
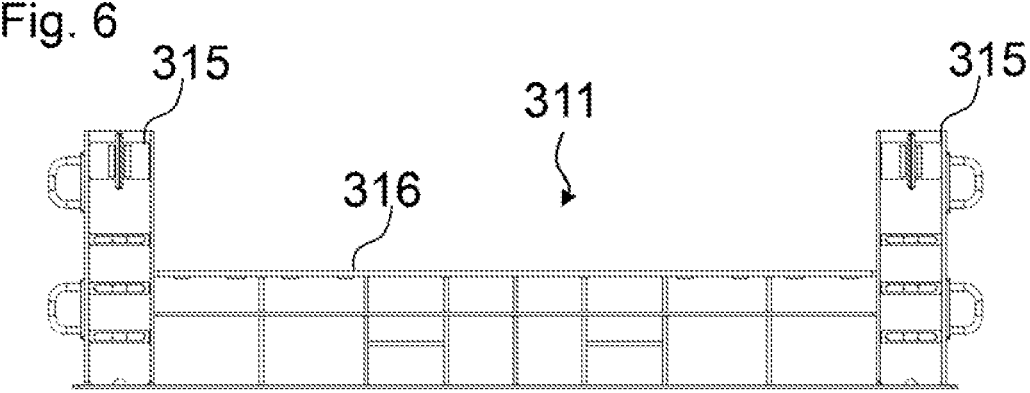
FIGS. 6 to 9 show a support base in front, top, side and perspective view.
Figure 7:
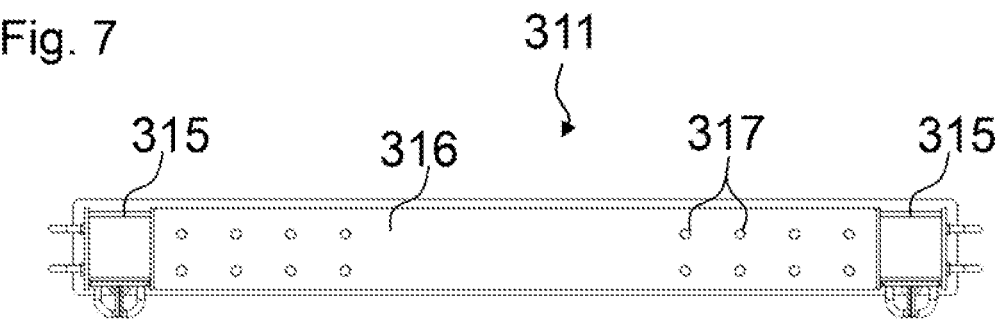
Figure 8:
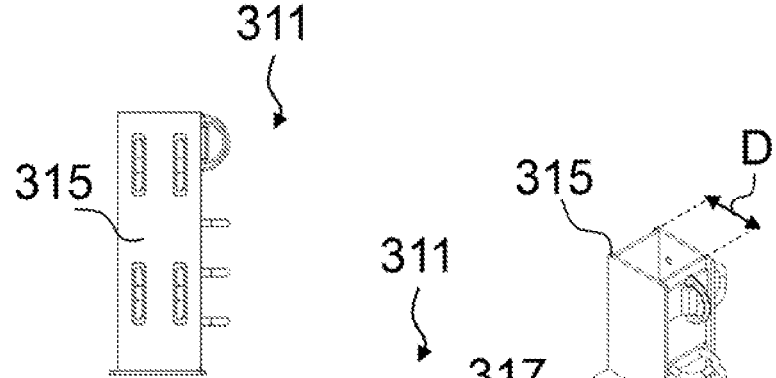

As further indicated in FIG. 4A, the abutment portion 3122 may include a shear shim plate 3126 for supporting the flange 313 (see FIG. 4B). The shear shim plate 3126 may particularly be provided at the connecting plates 312 such that a to-be-handled tower section rests on it to lower a shear force on bolts that hold the tower section during, for example, transportation. The shear shim plate 3126 can, for example, be welded to the abutment portion 3122.

The base portion 3121 and the abutment portion 3122 may, for example, be welded together. As can be seen in the figures, additional reinforcement elements 3125 may be arranged between the portions 3121, 3122, extending transversally from the portions 3121, 3122. The reinforcement elements 3125 act as rigidizers or ribs that give great stability to the structure, specifically against acceleration loads in a direction parallel to the longitudinal axis of to-be-handled tower sections, as well as against lateral loads forcing the to-be-handled tower sections to rotate about the longitudinal axis. The reinforcement elements 3125 are in particular evenly distributed over the width of the connection plate 312, preferably such that the bolt holes 3123, 3124 are easily accessible.

The reinforcement elements 3125 may particularly extend up to an edge of the base portion 3121 facing away from the abutment portion 3122. Some or all reinforcement elements 3125 may additionally or alternatively extend up to the upper edge of the abutment portion 3122 facing away from the base portion 3121. Preferably, at least two outer reinforcement elements 3125 extend up to the upper edge of the abutment portion 3122 facing away from the base portion 3121, whereas at least one intermediate reinforcement element 3125 arranged in between the outer reinforcement elements 3125 is distanced from the upper edge by at least a diameter of the bolt holes 3124 in the abutment portion 3122.

The diameter of the bolt holes 3124 in the abutment portion 3122 may vary with the circumference of the flange 13 or the size of the tower section 1, 2. In other words, depending on the size of the tower section 1, 2 at its end 11, 12, 21, 22, the diameter of the respective bolt holes 3124 and 14 may be selected. This may be particularly advantageous to assure that a proper connecting plate 312 is selected for the different tower sections 1, 2 and circumferences at their ends 11, 12, 21, 22.

On the other hand, for example, a diameter of the bolt holes 3123 may be independent of the to-be-handled tower section so as to match the corresponding bolt holes 317 in the upper surface 316 of the support base 311.

Figure 9:
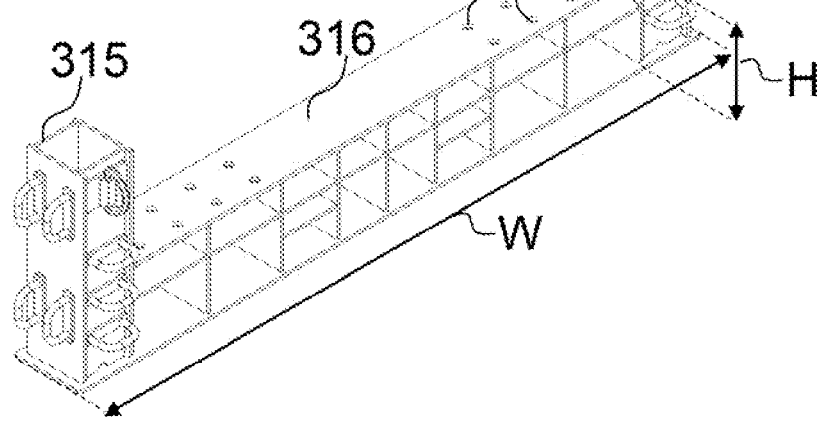
Figure 10:
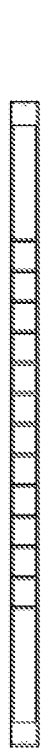
FIGS. 10 to 13 show a column in front, top, side and perspective view.
Figure 12:

In FIGS. 6 to 9, the support base 311 is depicted in front view (FIG. 6), top view (FIG. 7), side view (FIG. 8) and perspective view (FIG. 9).

Figure 13:
Figure 11:
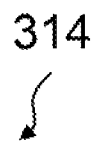

In FIGS. 10 to 13, one of the columns 314 is depicted in front view (FIG. 10), top view (FIG. 11), side view (FIG. 12) and perspective view (FIG. 13).

As can be seen from the figures, similar to the connecting plates 312, also the support base 311 and/or columns 314 may include reinforcement elements supporting their structure and acting as rigidizers.

Figure 14:
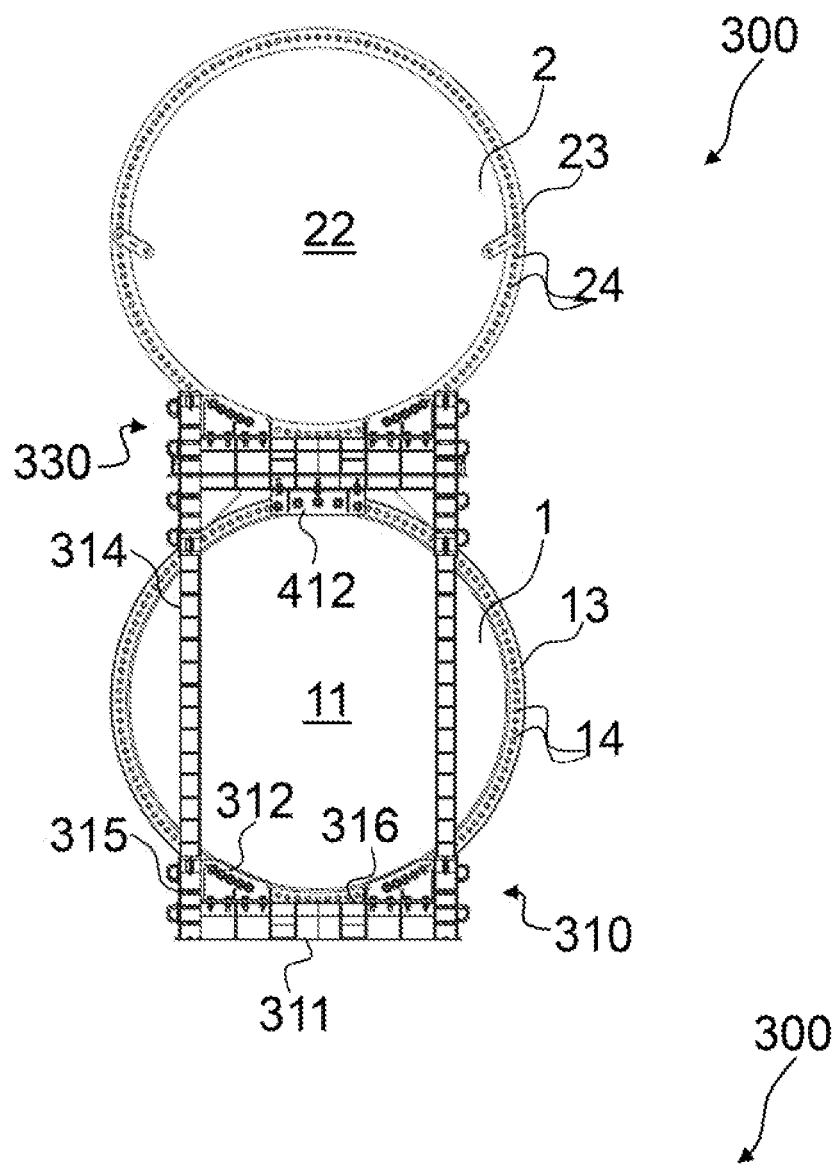
FIGS. 14 and 15 show the system of FIG. 2 in front and side view.
Figure 15:
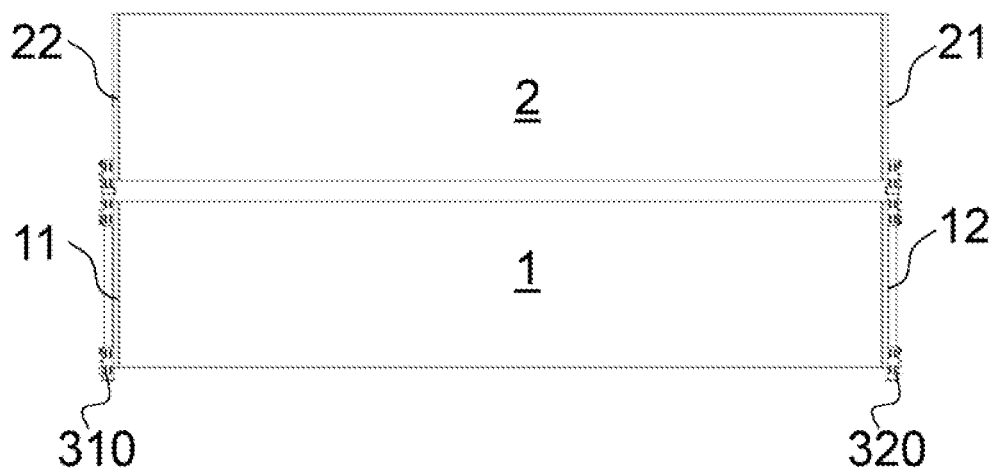

In FIGS. 14 and 15, the system 300 is depicted in front view (FIG. 14) and side view (FIG. 15).

A frame 310 with the support base 311 and connecting plates 312 allows to properly support a first tower section 1 at one end 11. Together with a corresponding second frame 320 supporting the first tower section 1 at the opposed second end 12, for example, a single tower section may be safely handled or transported. This can be particularly advantageous for transportation modes that dictate constraints as to dimensions and weight to be handled, such as trucks. On the other hand, other transportation modes such as ships may not be restricted, for example, in height. Accordingly, a system that enables handling of individual tower sections as well as handling additional tower sections without excessive modification is desirable.

In order to support a second tower section 2, the frames 310, 320 may include columns 314 to stack a further frame 330, 340 (see, for example, FIGS. 2, 14) for supporting the second tower section 2 on top of the first tower section 1.

Figure 2:
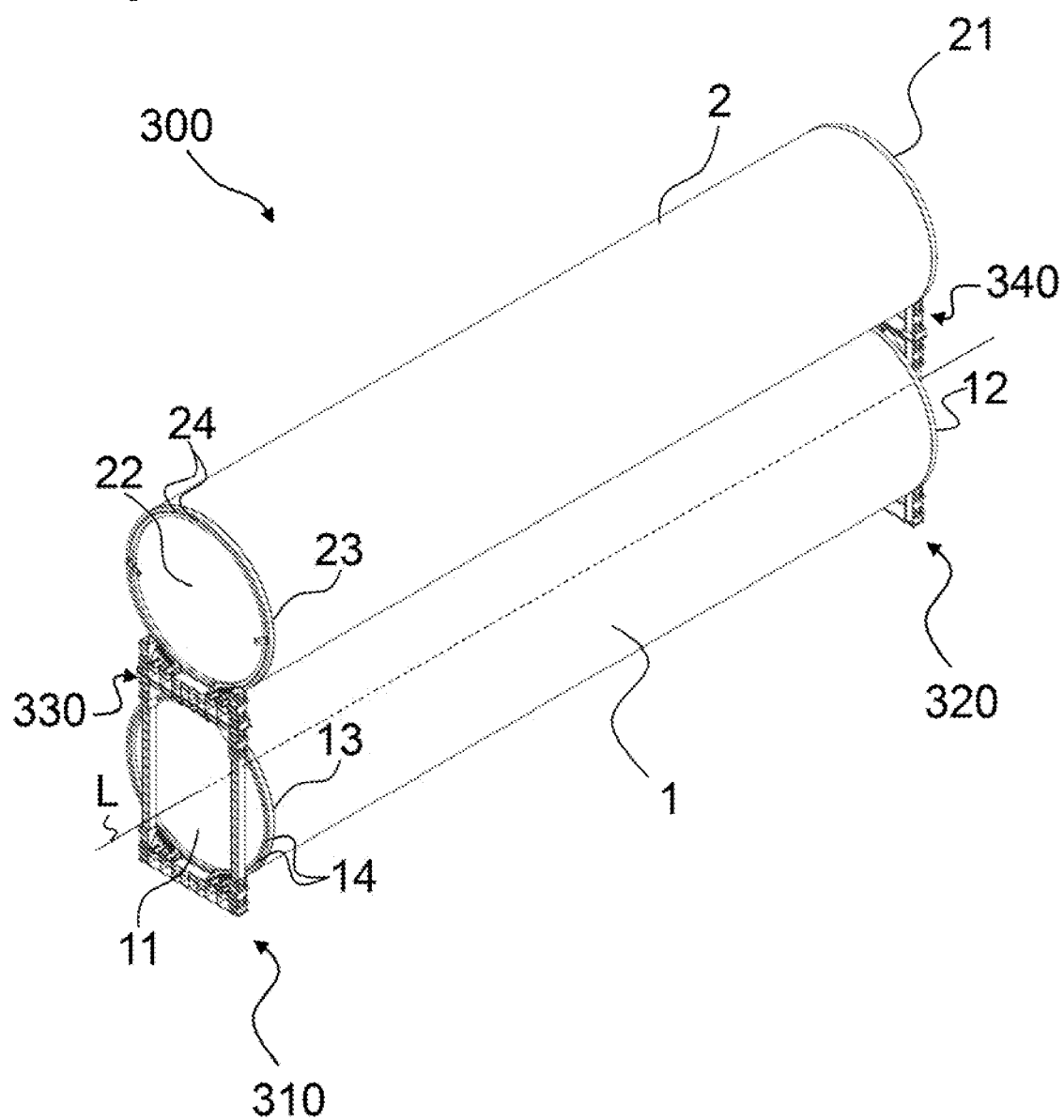
FIG. 2 shows a system for handling two wind turbine tower sections in perspective view.
Figure 16:
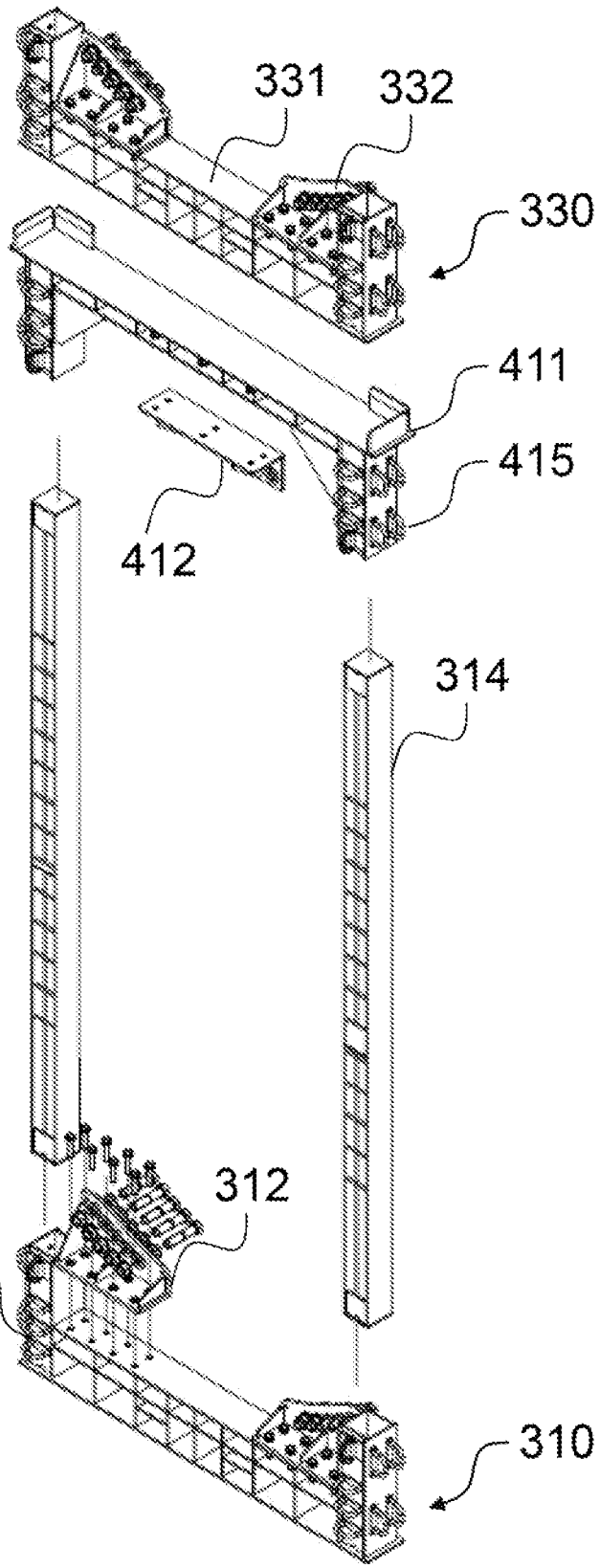
FIG. 16 shows the system of FIG. 2 in exploded view.
Figure 17:
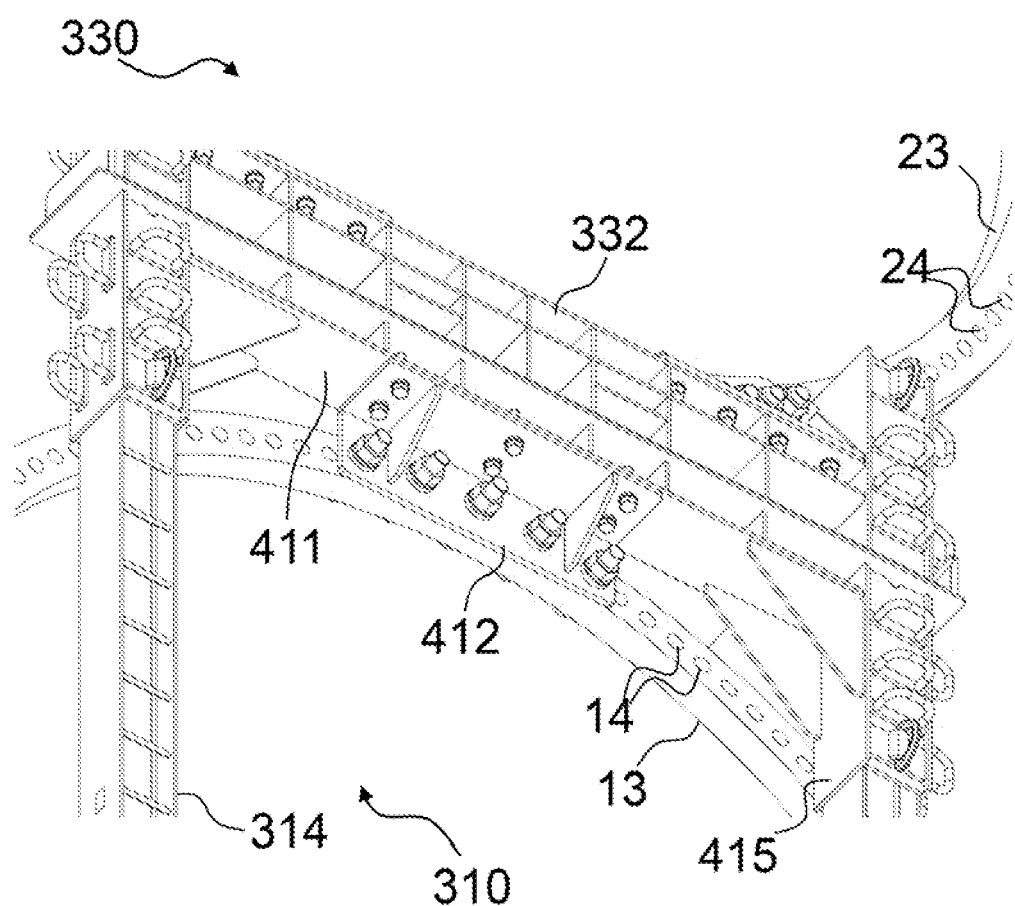
FIG. 17 shows another detail view of the system of FIG. 2.
Figure 18:
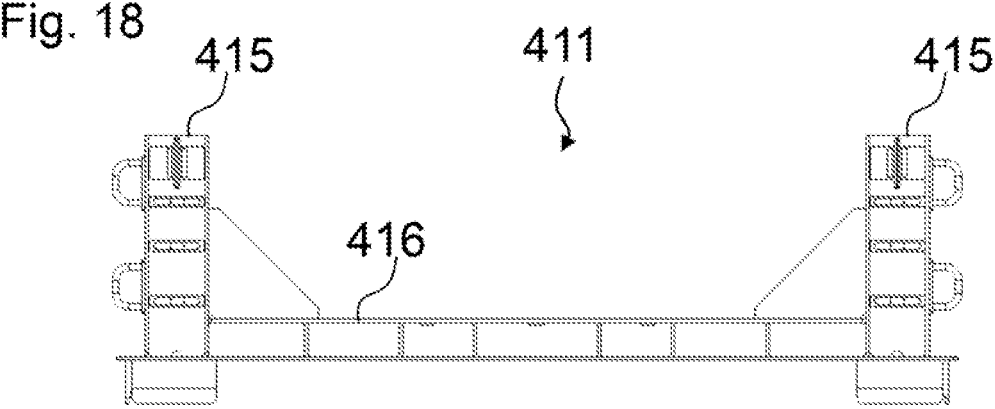
FIGS. 18 to 21 show an intermediate base in front, top, side and perspective view.
Figure 19:
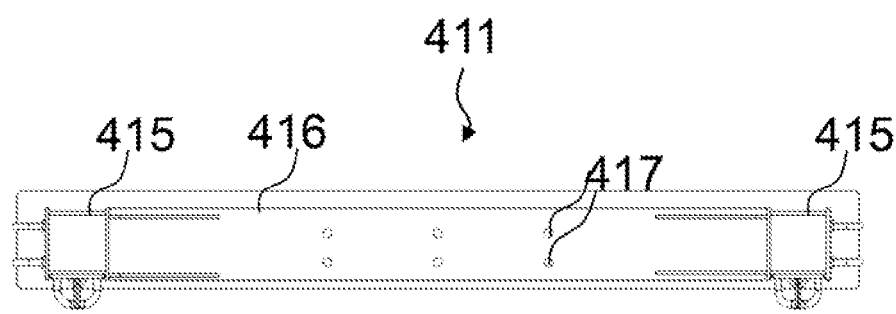
Figure 20:
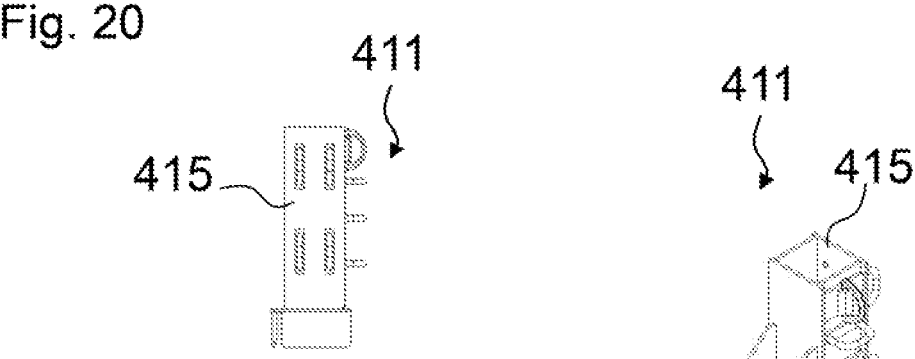
Figure 21:
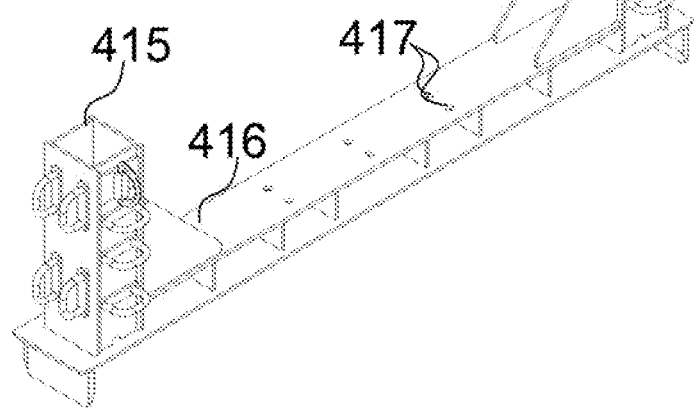
Figure 22:
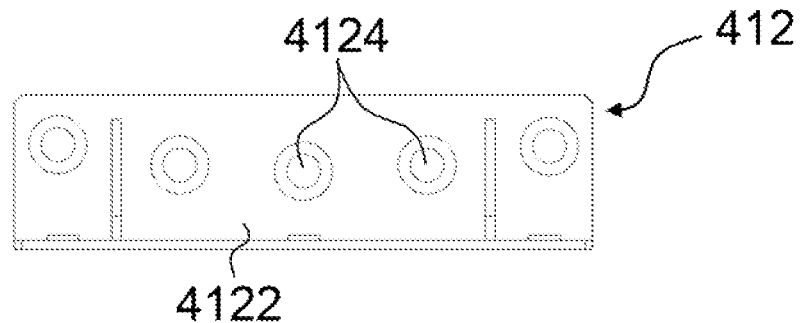
FIGS. 22 to 25 show an upper connecting plate in front, top, side and perspective view; and, FIG. 26 shows a schematic flow diagram of a method of operating the system of FIG. 2.
Figure 23:
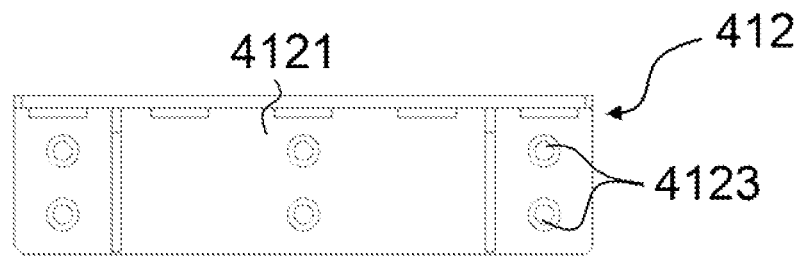
Figure 24:
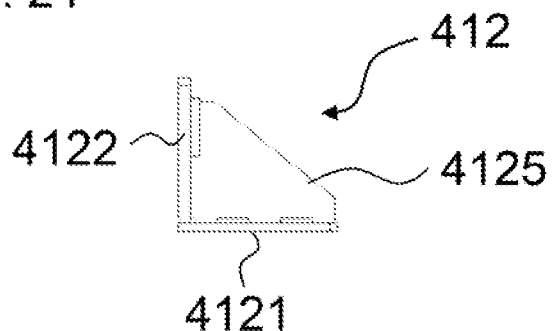
Figure 25:
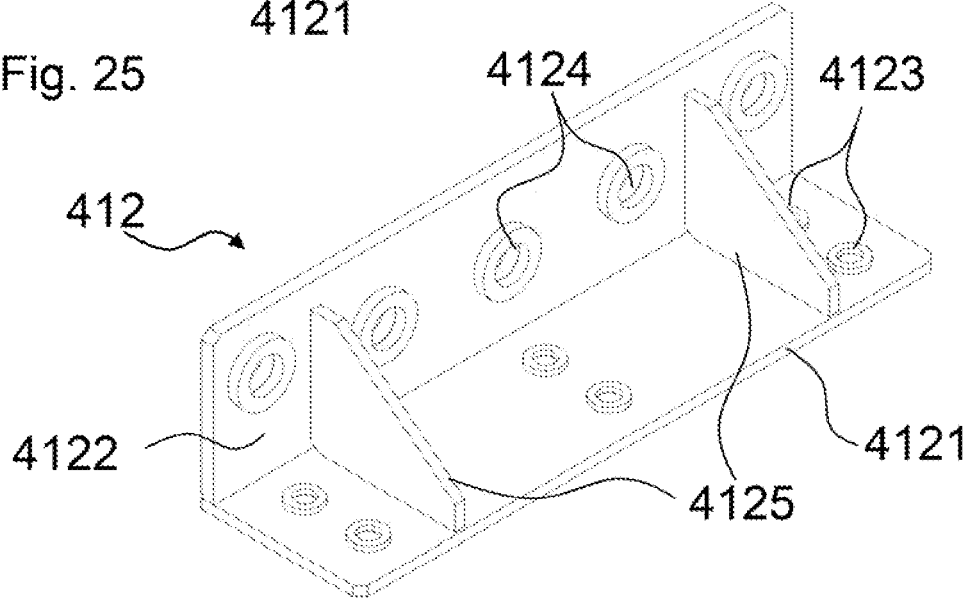

In the exploded view of the system of FIG. 2 as shown in FIG. 16 as well as the further detail view focusing on the upper part of the system of FIG. 2 as shown in FIG. 17, an example is shown where such a further frame 330 is stacked on top of the columns 314 of the first frame 310 underneath. It is apparent to the skilled person that the further frame 330 can be substantially identical to the first frame 310, that is, including at least a support base 331 and a pair of connecting plates 332. An intermediate base 411 with a pair of sheaths 415 to receive the top of the columns 314 may be provided in-between the further frame 330 and the first frame 310. The further frame 330 may be suitably coupled to the intermediate base 411. To further secure the lower first tower section 1, an upper connecting plate 412 may be arranged at the top of the first tower section 1 and configured to reversibly join together the support base 311 and the flange 13 via the columns 314 and intermediate base 411. In this respect, the upper connecting plate 412 may be configured similar to the connecting plates 312, see FIGS. 22 to 25 depicting the upper connecting plate 412 in front view (FIG. 22), top view (FIG. 23), side view (FIG. 24) and perspective view (FIG. 25) with a base portion 4121, abutment portion 4122, bolt holes 4123, 4124 and reinforcement elements 4125. Likewise, the intermediate base 411 may be configured similar to the support base 311, see FIGS. 18 to 21 depicting the intermediate base 411 in front view (FIG. 18), top view (FIG. 19), side view (FIG. 20) and perspective view (FIG. 21) with sheaths 415, "top" surface 416 and bolt holes 417.

As mentioned above, towers and tower sections may taper from base to top. The system 300 particularly enables the handling and transport of tapered individual tower sections as well as more than one potentially differently tapered tower section. In this respect, for example, based on the circumference of the lower tower section 1 at its respective ends, columns 314 of proper height as well as connecting plates 312, 412 are selected, while support bases 311, 331 of the frames 310-340 may be formed as equal parts and require no preselection. The system 300 may also be understood as a kit of parts with interchangeable columns 314 and connecting plates 312, 412.

Figure 26:
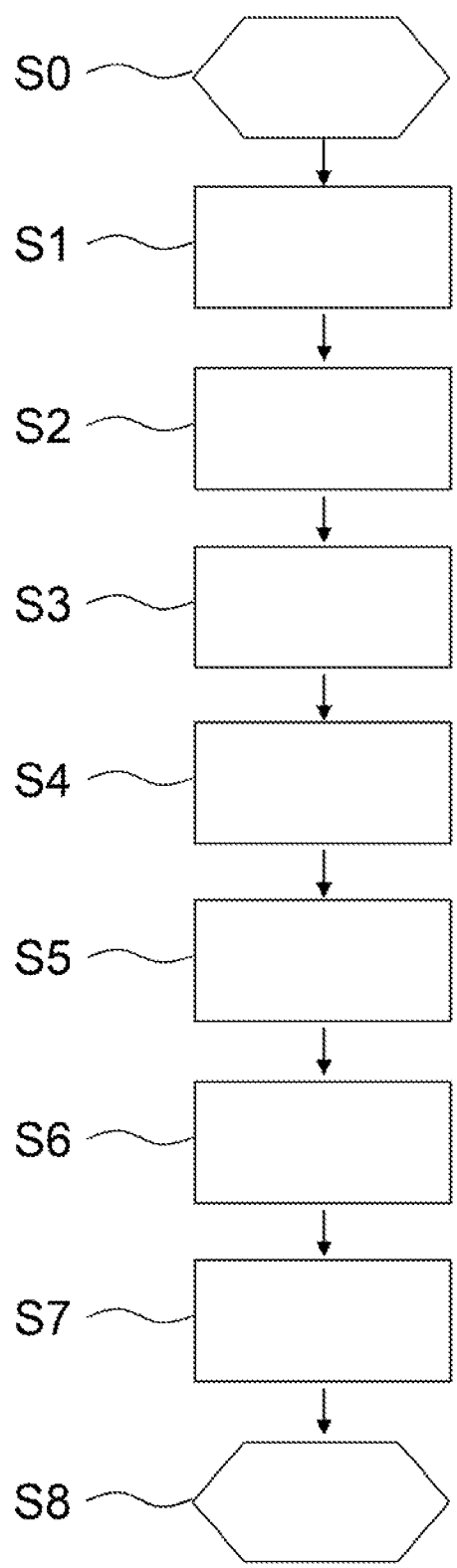

FIG. 26 shows a schematic flow diagram of a method of operating the system 300.

In step S0, the first tower section 1 is provided in horizontal orientation. Subsequently, in step S1, for example, based on the circumference of flange 13 and/or the curvature of bolt holes 14 of the flange 13 and/or the diameter of the bolt holes 14 of the flange 13, the first connecting plate(s) 312 is/are selected. Likewise, a selection of second connecting plate(s) for the second frame 320 may be performed. The connecting plates are then connected to the respective flange of the first tower section 1.

In step S2, support bases 311 and 312 are provided and the connecting plates connected on their respective upper surface 316.

In step S3, similar to step S0 the second tower section 2 is provided in horizontal orientation. Subsequently, in step S4, similar to step S1, for example, based on the circumference of flange 23 and/or the curvature of bolt holes 24 of the flange 23 and/or the diameter of the bolt holes 24 of the flange 23, connecting plate(s) of the third frame 330 is/are selected. Likewise, a selection of connecting plate(s) for the fourth frame 340 may be performed. The connecting plates are then connected to the respective flange of the second tower section 2.

In step S5, similar to step S2, support bases for the third and fourth frame 330, 340 are provided and the connecting plates connected on their respective upper surface.

In step S6, for example, based on the circumference of the first tower section 1 at its first end 11, the pair of columns 314 for the first frame 310 is selected. Likewise, a selection of columns for the second frame 320 may be performed.

In step S7, the intermediate base 411 is provided and arranged on the columns 314 of the first frame 310. Likewise an intermediate base is provided and arranged on the columns of the second frame 320.

In step S8, the third and fourth frames 330, 340 supporting the second tower section 2 are stacked on top of the first and second frames 310, 320, received by the respective intermediate base. The two tower sections 1, 2 may thus be stacked in alternating manner, that is, their larger sized ends face in different directions. Alternatively, their larger sized ends face the same directions or at least one of the tower sections has equally sized ends.

It shall be pointed out that this flow diagram is merely exemplary and that particularly the order of steps [[and]] could vary in practice as can be understood by a person skilled in the art. For example, the connecting plates may be attached to the support bases prior to attaching them to the flanges. Also, the two tower sections may be attached to the respective frames in parallel rather than subsequently.

In the following embodiments of the disclosure are described by way of clauses.

1. A system for handling a wind turbine tower section, the tower section having a longitudinal axis and extending along the longitudinal axis from a first end with a flange to an opposing second end, the system comprising:
   a first frame configured to support the first end of the tower section, the first frame comprising a first support base and a first connecting plate provided thereon, comprising
   a base portion configured to be attached to the first support base, and
   an abutment portion extending transversally from the base portion and configured to be attached to the flange of the first end of the tower section
   a second frame configured to support the second end of the tower section, the second frame comprising a second support base and a second connecting plate provided thereon, comprising
   a base portion configured to be attached to the second support base, and
   an abutment portion extending transversally from the base portion and configured to be attached to the flange of the second end of the tower section.

2. The system of clause 1, wherein
   the first frame comprises a pair of first connecting plates configured to be arranged on the first support base such that the first end of the tower section is fixedly connected to the first support base by each of the first connecting plates at substantially the same distance from the longitudinal axis of the tower section, and/or
   the second frame comprises a pair of second connecting plates configured to be arranged on the second support base such that the second end of the tower section is fixedly connected to the second support base by each of the second connecting plates at substantially the same distance from the longitudinal axis of the tower section.

3. The system of any of the preceding clauses, further comprising an upper connecting plate comprising
   a base portion configured to be attached to the first or second support base, and
   an abutment portion extending transversally from the base portion and configured to be attached to the flange of the first or second end of the tower section,
   wherein the upper connecting plate is configured to be arranged at an upper side of the first or second end of the tower section opposite to the first or second connecting plates with respect to the longitudinal axis.

4. The system of any of the preceding clauses, wherein the connecting plates are L-shaped.

5. The system of any of the preceding clauses, wherein the connecting plates each comprise two, three or more reinforcement elements each extending from the base portion of the respective connecting plate towards and connecting it to the abutment portion of the respective connecting plate.

6. The system of any of the preceding clauses, wherein the flange of the first end of the tower section comprises a plurality of bolt holes along a first curvature, the flange of the second end of the tower section comprises a plurality of bolt holes along a second curvature different from the first curvature, and
   the abutment portion of the first connecting plates comprises bolt holes corresponding to a respective portion of the bolt holes of the flange of the first end of the tower section along the first curvature, and the abutment portion of the second connecting plates comprises bolt holes corresponding to a respective portion of the bolt holes of the flange of the second end of the tower section along the second curvature.

7. The system of any of the preceding clauses, wherein bolt holes at the flange of the first end of the tower section have a first diameter, bolt holes at the flange of the second end of the tower section have a second diameter different from the first diameter, and bolt holes at the abutment portions of the first and second connecting plates have a diameter corresponding to the respective diameter of the bolt holes at the respective flange.

8. The system of any of the preceding clauses, wherein the support bases each comprise a pair of hole patterns, each hole pattern comprising a plurality of bolt holes, and the base portion of the first and second connecting plates comprises bolt holes each corresponding to at least a portion of the plurality of bolt holes of one of the hole patterns of the respective support base.

9. The system of any of the preceding clauses, wherein the frames comprise means to receive a pair of columns on the respective support base, the columns being configured to support a further frame to be stacked above and the columns being adapted in height corresponding to the respective circumference of the tower section at the respective end of the tower section supported by the respective frame.

10. The system of any of the preceding clauses, wherein the frames further comprise means to receive a pair of columns underneath the respective support base, the columns being configured to support the respective frame and adapted in height corresponding to a respective circumference of a further wind tower section to be arranged underneath the respective frame at a respective end of the further tower section.

11. The system of any of the preceding clauses 9 or 10, wherein the first end of the tower section has a first circumference, the second end of the tower section has a second circumference and the first circumference is greater than the second circumference, and the system is configured to support above or below the tower section a further wind turbine tower section having a first end of greater circumference than at an opposing second end, and arranged such that the second end of the further tower section is supported by the further frame stacked above or below the first frame.

12. A method for use of the system of any of the preceding clauses, comprising:
    providing in a horizontal orientation a first wind turbine tower section having a longitudinal axis and extending along the longitudinal axis from a first end with a flange to an opposing second end;
    selecting a connecting plate, arranging the connecting plate such that its abutment portion faces the flange and fixedly connecting the abutment portion to the flange; and
    providing a support base, arranging the connecting plate such that its base portion faces the support base and fixedly connecting the base portion to the support base.

13. The method of clause 12, further comprising:
    providing in a horizontal orientation a second wind turbine tower section having a longitudinal axis and extending along the longitudinal axis from a first end to an opposing second end with a flange;
    selecting a further connecting plate, arranging the further connecting plate such that its abutment portion faces the flange of the second tower section and fixedly connecting the abutment portion of the further connecting plate to the flange of the second tower section;
    selecting a pair of columns, arranging the columns in a vertical orientation on the support base;
    providing a further support base and arranging the further support base on the columns; and
    arranging the further connecting plate such that its base portion faces the further support base and fixedly connecting the base portion of the further connecting plate to the further support base such that the second tower section is arranged parallel to and in immediate vicinity of the first tower section with the first end of the second tower section directly above the second end of the first tower section, and the second end of the second tower section directly above the first end of the first tower section, wherein a circumference at the first end of the first tower section is greater than at the second end of the first tower section, and a circumference at the first end of the second tower section is greater than at the second end of the second tower section.

14. The method of clause 13, further comprising:
    providing in a horizontal orientation a second wind turbine tower section having a longitudinal axis and extending along the longitudinal axis from a first end to an opposing second end with a flange;
    selecting a further connecting plate, arranging the further connecting plate such that its abutment portion faces the flange of the second tower section and fixedly connecting the abutment portion of the further connecting plate to the flange of the second tower section;
    selecting a pair of columns, arranging the columns in a vertical orientation on the support base;
    providing a further support base and arranging the further support base on the columns; and
    arranging the further connecting plate such that its base portion faces the further support base and fixedly connecting the base portion of the further connecting plate to the further support base such that the second tower section is arranged parallel to and in immediate vicinity of the first tower section with the first end of the second tower section directly above the second end of the first tower section, and the second end of the second tower section directly above the first end of the first tower section, wherein a circumference at the first end of the first tower section is greater than at the second end of the first tower section, and a circumference at the first end of the second tower section is smaller than at the second end of the second tower section.

15. The method of any of clauses 12 to 14, wherein selecting the respective connecting plates is based on a circumference of the respective flange and/or a curvature of bolt holes of the respective flange and/or a diameter of the bolt holes of the respective flange and/or wherein selecting the pair of columns is based on a circumference of the first tower section at the first end.

The invention shall not be limited by the description. Rather, the invention shall encompass any feature as well as any combination of features, which in particular includes any combination of features in the claims, even if this feature or combination itself is not explicitly stated in the claims or embodiments or clauses.

It is understood that the foregoing description is that of the preferred embodiments of the invention and that various changes and modifications may be made thereto without departing from the spirit and scope of the invention as defined in the appended claims.

The invention claimed is:

1. A system for handling a wind turbine tower section, the wind turbine tower section extending along a longitudinal axis from a first end with a flange to an opposing second end, the system comprising:
   a first frame configured to support the first end of the tower section, said first frame including a first support base and a first connecting plate provided on said first support base;
   said first connecting plate including a first base portion configured to be attached to said first support base and a first abutment portion extending transversely from said first base portion;
   said first abutment portion being configured to be attached to the flange of the first end of the tower section;
   a second frame configured to support the second end of the tower section, said second frame including a second support base and a second connecting plate provided on said second support base;
   said second connecting plate including a second base portion configured to be attached to said second support base and a second abutment portion extending transversely from said second base portion;
   said second abutment portion being configured to be attached to a flange of the second end of the tower section;
   wherein the first support base includes a first upper surface configured to be attached to the first base portion of the first connecting plate; the second support base includes a second upper surface configured to be attached to the second base portion of the second connecting plate; wherein the first upper surface, the first base portion of the first connecting plate when connected to the first upper surface, the second upper surface and the second base portion of the second connecting plate when connected to the second upper surface, extend parallel to ground.

2. The system of claim 1, wherein at least one of:
said first frame includes a pair of first connecting plates including said first connecting plate and a further first connecting plate, said pair of first connecting plates being configured to be arranged on said first support base such that the first end of the tower section is fixedly connected to said first support base by each of said pair of first connecting plates at a same distance from the longitudinal axis of the tower section; and,
said second frame includes a pair of second connecting plates including said second connecting plate and a further second connecting plate, said pair of second connecting plates being configured to be arranged on said second support base such that the second end of the tower section is fixedly connected to said second support base by each of said pair of second connecting plates at a same distance from the longitudinal axis of the tower section.

3. The system of claim 1 further comprising:
an upper connecting plate including an upper connecting plate base portion configured to be attached to the first or second support base and an upper connecting plate abutment portion extending transversely from said upper connecting plate base portion;
said upper connecting plate abutment portion being configured to be attached to the flange of the first or second end of the tower section; and,
said upper connecting plate being configured to be arranged at an upper side of the first end or of the second end of the tower section opposite to said first connecting plate or said second connecting plate with respect to the longitudinal axis.

4. The system of claim 1, wherein said first connecting plate and said second connecting plate are L-shaped.

5. The system of claim 1, wherein said first connecting plate includes at least two reinforcement elements extending from said first base portion toward and connecting said first base portion to said first abutment portion; and,
said second connecting plate includes at least two reinforcement elements extending from said second base portion toward and connecting said second base portion to said second abutment portion.

6. The system of claim 1, wherein the flange of the first end of the tower section defines a plurality of first bolt holes along a first curvature, the flange of the second end of the tower section defines a plurality of second bolt holes along a second curvature different from the first curvature; and,
said first abutment portion defines a plurality of first abutment bolt holes corresponding to a respective portion of the plurality of first bolt holes of the flange of the first end of the tower section along the first curvature, and said second abutment portion defines a plurality of second abutment bolt holes corresponding to a respective portion of the plurality of second bolt holes of the flange of the second end of the tower section along the second curvature.

7. The system of claim 1, wherein the flange of the first end of the tower section defines at least one first bolt hole, the flange of the second end of the tower section defines at least one second bolt hole, said first abutment portion defines at least one first abutment bolt hole, and said second abutment portion defines at least one second abutment bolt hole; the at least one first bolt hole has a first diameter; the at least one second bolt hole has a second diameter different from the first diameter; said first abutment bolt hole has a first abutment bolt hole diameter corresponding to the first diameter; and, said second bolt hole has a second bolt hole diameter corresponding to the second diameter.

8. The system of claim 1, wherein said first support base and said second support base each define a pair of hole patterns, each of said hole patterns defining a plurality of bolt holes; and, said first base portion and said second base portion each define bolt holes corresponding to at least a portion of said plurality of bolt holes of one of said hole patterns of a respective one of said first support base and said second support base.

9. The system of claim 1, wherein said first frame includes two first receivers each configured to receive one of a first pair of columns on said first support base; said second frame includes two second receivers each configured to receive one of a second pair of columns on said second support base; said first and second pair of columns being configured to support a further frame to be stacked above; said first pair of columns being adapted in height to correspond to a circumference of the tower section at the first end; and, said second pair of columns being adapted to correspond to a circumference of the tower section at the second end.

10. The system of claim 1, wherein said first frame includes two first receivers each configured to receive one of a first pair of columns from underneath said first support base; said second frame includes two second receivers each configured to receive one of a second pair of columns from underneath said second support base; said first pair of columns being adapted in height to correspond to a circumference of the tower section at the first end; and, said second pair of columns being adapted in height to correspond to a circumference of the tower section at the second end.

11. The system of claim 9, wherein the first end of the tower section has a first circumference; the second end of the tower section has a second circumference and the first circumference is greater than the second circumference; and, the system is configured to support above or below the tower section a further wind turbine tower section having a first end of greater circumference than at an opposing second end, and arranged such that the second end of the further tower section is supported by the further frame stacked above or below the first frame.

12. The system of claim 10, wherein the first end of the tower section has a first circumference, the second end of the tower section has a second circumference and the first circumference is greater than the second circumference, and the system is configured to support above or below the tower section a further wind turbine tower section having a first end of greater circumference than at an opposing second end, and arranged such that the second end of the further tower section is supported by the further frame stacked above or below the first frame.

13. A method for operating a system for handling a wind turbine tower section, the tower section having a longitudinal axis and extending along the longitudinal axis from a first end with a flange to an opposing second end, the system comprising:
a first frame configured to support the first end of the tower section, said first frame including a first support base and a first connecting plate provided on said first support base;
said first connecting plate including a first base portion configured to be attached to said first support base and a first abutment portion extending transversely from said first base portion;
said first abutment portion being configured to be attached to the flange of the first end of the tower section;
a second frame configured to support the second end of the tower section, said second frame comprising a second support base and a second connecting plate provided on said second support base;
said second connecting plate including a second base portion configured to be attached to said second support base and a second abutment portion extending transversely from said second base portion; and,
said second abutment portion being configured to be attached to a flange of the second end of the tower section, wherein the first support base includes a first upper surface configured to be attached to the first base portion of the first connecting plate; the second support base includes a second upper surface configured to be attached to the second base portion of the second connecting plate; wherein the first upper surface, the first base portion of the first connecting plate when connected to the first upper surface, the second upper surface and the second base portion of the second connecting plate when connected to the second upper surface, extend parallel to ground, the method comprising:
providing in a horizontal orientation a first wind turbine tower section extending along a longitudinal axis from a first end with a flange to an opposing second end;
selecting a connecting plate, arranging the connecting plate such that an abutment portion of the connecting plate faces the flange and fixedly connecting the abutment portion to the flange; and,
providing a support base, arranging the connecting plate such that a base portion of the connecting plate faces the support base and fixedly connecting the base portion to the support base.

14. The method of claim 13 further comprising:
providing in a horizontal orientation a second wind turbine tower section extending along a longitudinal axis from a first end to an opposing second end with a flange;
selecting a further connecting plate, arranging the further connecting plate such that an abutment portion of the further connecting plate faces the flange of the second tower section and fixedly connecting the abutment portion of the further connecting plate to the flange of the second tower section;
selecting a pair of columns, arranging the columns in a vertical orientation on the support base;
providing a further support base and arranging the further support base on the columns; and,
arranging the further connecting plate such that a base portion of the further connecting plate faces the further support base and fixedly connecting the base portion of the further connecting plate to the further support base such that the second tower section is arranged parallel to and in immediate vicinity of the first tower section with the first end of the second tower section directly above the second end of the first tower section, and the second end of the second tower section directly above the first end of the first tower section, wherein a circumference at the first end of the first tower section is greater than at the second end of the first tower section, and a circumference at the first end of the second tower section is greater than at the second end of the second tower section.

15. The method of claim 13 further comprising:
providing in a horizontal orientation a second wind turbine tower section extending along a longitudinal axis from a first end to an opposing second end with a flange;
selecting a further connecting plate, arranging the further connecting plate such that an abutment portion of the further connecting plate faces the flange of the second tower section and fixedly connecting the abutment portion of the further connecting plate to the flange of the second tower section;

selecting a pair of columns, arranging the columns in a vertical orientation on the support base;

providing a further support base and arranging the further support base on the columns; and, arranging the further connecting plate such that a base portion of the further connecting plate faces the further support base and fixedly connecting the base portion of the further connecting plate to the further support base such that the second tower section is arranged parallel to and in immediate vicinity of the first tower section with the first end of the second tower section directly above the second end of the first tower section, and the second end of the second tower section directly above the first end of the first tower section, wherein a circumference at the first end of the first tower section is greater than at the second end of the first tower section, and a circumference at the first end of the second tower section is smaller than at the second end of the second tower section.

16. The method of claim 13, wherein said selecting the connecting plate is based on a circumference of the flange.

17. The method of claim 13, wherein said selecting the connecting plate is based on a curvature of bolt holes of the flange.

18. The method of claim 14, wherein said selecting the pair of columns is based on a circumference of the first tower section at the first end.

19. The method of claim 15, wherein said selecting the pair of columns is based on a circumference of the first tower section at the first end.

20. The system of claim 1, wherein said first abutment portion includes a shear shim plate configured to support the flange of the first end of the tower section.

21. A kit of parts for handling wind turbine tower sections, each of the tower sections having a longitudinal axis and extending along the longitudinal axis from a first end with a flange to an opposing second end with another flange, each of the flanges including a plurality of bolt holes along a respective bolt hole curvature, wherein the tower sections include at least a tower section having a flange having a first bolt hole curvature and a flange having a second bolt hole curvature, the kit of parts comprising:

a support base; and a plurality of connecting plates, each of the connecting plates including:

a base portion configured to be attached to the support base to form a frame configured to support a respective end of one of the tower sections, and an abutment portion extending transversely from the base portion and configured to be attached to a flange of a particular tower section, wherein the kit of parts includes at least one first connecting plate with an abutment portion including bolt holes corresponding to the first bolt hole curvature, and one second connecting plate with an abutment portion including bolt holes corresponding to the second bolt hole curvature; and, wherein the first support base includes a first upper surface configured to be attached to the first base portion of the first connecting plate; the second support base includes a second upper surface configured to be attached to the second base portion of the second connecting plate; wherein the first upper surface, the first base portion of the first connecting plate when connected to the first upper surface, the second upper surface and the second base portion of the second connecting plate when connected to the second upper surface, extend parallel to ground.

* * * * *